US012579899B2

(12) United States Patent
Arethens et al.

(10) Patent No.: US 12,579,899 B2
(45) Date of Patent: Mar. 17, 2026

(54) METHOD FOR SELECTING AT LEAST ONE SATELLITE NAVIGATION SERVICE PROVIDER AND ASSOCIATED SELECTION SYSTEM

(71) Applicant: THALES, Courbevoie (FR)

(72) Inventors: Jean-Pierre Arethens, Valence (FR); Denis Bouvet, Valence (FR)

(73) Assignee: THALES, Courbevoie (FR)

( * ) Notice: Subject to any disclaimer, the term of this patent is extended or adjusted under 35 U.S.C. 154(b) by 184 days.

(21) Appl. No.: 18/454,351

(22) Filed: Aug. 23, 2023

(65) Prior Publication Data

US 2024/0071235 A1     Feb. 29, 2024

(30) Foreign Application Priority Data

Aug. 30, 2022     (FR) .................................. FR2208670

(51) Int. Cl.
*G08G 5/50*          (2025.01)
*G01S 19/07*         (2010.01)
*G08G 5/55*          (2025.01)

(52) U.S. Cl.
CPC .............. *G08G 5/50* (2025.01); *G01S 19/072* (2019.08); *G08G 5/55* (2025.01)

(58) Field of Classification Search
CPC ........ G01S 19/072; G01S 19/14; G01S 19/41; G08G 5/50; G08G 5/55
See application file for complete search history.

(56) References Cited

U.S. PATENT DOCUMENTS

| | | | | |
|---|---|---|---|---|
| 2016/0061956 A1* | 3/2016 | Savoy, Jr. | ............... | G01S 19/03 |
| | | | | 342/357.4 |
| 2022/0058960 A1* | 2/2022 | Stein | ..................... | B64C 39/024 |
| 2022/0400532 A1* | 12/2022 | Kalkunte | .............. | H04W 76/15 |
| 2023/0189030 A1* | 6/2023 | Hindy | .................... | G06N 5/027 |
| | | | | 370/252 |
| 2024/0118710 A1* | 4/2024 | Stein | ................... | G05D 1/2437 |

OTHER PUBLICATIONS

Search Report for French Application FR 22 08670 dated Apr. 22, 2023.

(Continued)

*Primary Examiner* — Fadey S. Jabr
*Assistant Examiner* — Michael J Herrera
(74) *Attorney, Agent, or Firm* — McDonald Hopkins LLC

(57)     ABSTRACT

A method for selecting at least one satellite navigation service provider from a plurality of predetermined providers, the selection method being computer-implemented and comprising: a step for receiving a geographical position; a step of determining an indication relating to the authorization of use of at least one provider of the plurality of predetermined providers, the determining step being implemented by at least one artificial neural network (24) associated with said provider, an input variable of the artificial neural network (24) being the geographical position, an output variable of the artificial neural network (24) being said indication; a step for selecting at least one provider for satellite navigation of an aircraft.

13 Claims, 5 Drawing Sheets

(56) References Cited

OTHER PUBLICATIONS

Dennis et al., "Assessment of Methods of Trigger Transition between Multiple SBAS", ITM 2014—Proceedings of THE2014 International Technical Meeting of the Institute of Navigation, the Institute of Navigation, XP056008079, pp. 201-211, Jan. 29, 2014.

Dennis et al., "Selecting Among Dual Frequency Multiple Constellation (DFMC) Satellite-based Augmentation Systems (SBAS) During En-route and Non-Precision Flight Operations". Navigation: Journal of the Institute of Navigation, Institute of Navigation, vol. 63, No. 1, Jan. 26, 2015.

Dennis et al., "Refinement of Broadcast Integrity Methods for Space Based Augmentation System Selection", ITM 2015—Proceedings of The 2015 International Technical Meeting of the Institute of Navigation, the Institute of Navigation, pp. 404-414, XP056008708, Jan. 28, 2015.

* cited by examiner

<u>FIG.2</u>

METHOD FOR SELECTING AT LEAST ONE SATELLITE NAVIGATION SERVICE PROVIDER AND ASSOCIATED SELECTION SYSTEM

FIELD

The present invention relates to a method for selecting at least one satellite navigation service provider.

The invention also relates to a system for selecting at least one satellite navigation service provider.

The invention relates to the field of satellite navigation, particularly for aircraft.

BACKGROUND

As is well known, the Global Navigation Satellite System (GNSS) makes it possible to obtain a geographical position from signals emitted by satellites. Several basic satellite constellations are known to enable the introduction of GNSS-based services: GPS, GLONASS, Galileo and the Beidou satellite navigation system.

The use of these four basic constellations to meet the needs of international civil aviation is subject to very specific requirements. For example, operations based on the use of these constellations under Instrument Flight Rules (IFR) require the reinforcement (or monitoring) of basic satellite constellation signals to meet safety and reliability requirements.

It is also known to reinforce the GNSS signals, for example, by an on board aircraft augmentation system (ABAS), a ground-based augmentation system (GBAS) or a satellite-based augmentation system (SBAS).

In the case of satellite-based augmentation systems, a number of SBAS service providers for augmenting signals from basic constellations are known. These services are accessible to any user located in the area illuminated by the satellites, generally in geostationary orbit (GEO), transmitting SBAS data. As the geographical areas thus illuminated are large and may overlap, certain state authorities may impose the use of an SBAS service provider on their territory, or a contrario prohibit the explicit use of one or more SBAS service providers.

To take such criteria into account when choosing a provider, it is possible to generate a database comprising the providers for a large number of positions to be used, based on known geopolitical regions. According to another example, complex geographical regions can be predefined from geopolitical regions to define the use of SBAS service providers.

However, such solutions are complex. For example, to cover the entire surface of the earth, the number of positions defined in the database is very high, and the database is thus very large.

Also, in the event of a change in provider selection, for example a ban on the use of a specific provider in the territory of a given country, it is necessary to regenerate the database. This regeneration often involves a high computational cost.

SUMMARY

One aim of the present invention is to at least partially remedy the aforementioned drawbacks.

In particular, one aim of the present invention is to obtain a method for selecting at least one satellite navigation service provider, which is simple and flexible.

To this end, the invention has as its object a method for selecting at least one satellite navigation service provider from a plurality of predetermined providers, the selection method being computer-implemented and comprising:

a step of receiving a geographical position;

a step of determining an indication relating to the authorization to use at least one provider from the plurality of predetermined providers, the determination step being implemented by at least one artificial neural network associated with said provider, an input variable of the artificial neural network being the geographical position, an output variable of the artificial neural network being said indication, the indication being selected from authorizing the use of said provider at said geographical position and prohibiting the use of said provider at said geographical position, when the indication indicates the authorization of the use of said provider at said geographical position, the provider being referred to as the authorized provider;

a step of selecting at least one provider for satellite navigation of an aircraft, from the or each authorized provider.

The selection method is particularly simple, as the artificial neural network(s) provide(s) one or more indications relative to the authorization of the provider to use the geographical position. This thus makes it particularly easy to obtain the authorized supplier(s).

Furthermore, when the authorization or prohibition to use a specific provider is modified, it is sufficient to update the artificial neural network concerned.

In particular, the selection method allows the provider(s) to be selected without the need for a complex database.

The selection method is also particularly reliable, as each neural network is associated with a specific provider. As a result, the neural network concerned is easily adaptable for that provider.

In addition, the selection method allows the performance of an artificial neural network to be verified, in other words, an indication corresponding, for example, to a defined constraint, to be verified in a separate manner for this network, by verifying the output of this artificial neural network for different positions.

According to other advantageous aspects of the invention, the selection method comprises one or more of the following features, taken singly or in any technically possible combinations:

each provider is an SBAS service provider or a GNSS service provider;

the determination step is implemented by a plurality of artificial neural networks, each artificial neural network being associated with one respective provider of the plurality of predetermined providers, the output variable being the indication for said provider;

the or each artificial neural network comprises at least one hidden layer comprising a plurality of nodes, each node implementing an activation function;

the activation function is formed by a sigmoid function;

the or each artificial neural network further comprises an output layer implementing an activation function formed by a logistic function;

the selection method further comprises a provider preselection step, in which at least one provider is obtained from the plurality of predetermined providers, as a function of a predefined activation region for this provider, the or each provider being said to be an activated provider when the geographical position lies within the respective activation region;

the determination step comprises determining the indication only for the or each activated provider, by the artificial neural network(s) associated with said activated provider(s);

the activation region of at least one provider of the plurality of providers is devoid of geographical positions or is a global region;

the geographical position is a current position of the aircraft or a destination position;

the selection method comprises a phase of training the or each artificial neural network by supervised learning, comprising, providing the or each artificial neural network with a plurality of geographical training positions, and comprising providing the indication for each geographical training position;

the indication provided during the training phase depends, for each geographical training position, on at least one element, preferably on all of the following elements: a constraint on the use of providers by at least one state authority at said geographical training position, an availability of ionospheric signal corrections for the geographical training position, a coverage region of one or more satellites of one of the providers of the plurality of predetermined providers, a predefined activation region for one of the providers of the plurality of predetermined providers.

the selection method further comprises a verification phase, comprising:

a step of supplying the or each artificial neural network with a plurality of geographical verification positions;

a step of obtaining, for each geographical verification position, the output indication of the corresponding artificial neural network;

a step of comparing each indication obtained during the obtaining step with an expected indication for the corresponding geographical verification position, to obtain a comparison result;

a step of calculating a success rate of the or each artificial neural network as a function of the comparison result;

when the success rate is less than a predetermined rate for the artificial neural network in the calculation step, the activation region is divided into a number of sub-regions, and in which the supply step, the obtaining step and the comparison step are repeated for each sub-region.

The invention also has as its object a system for selecting at least one satellite navigation service provider from a plurality of predetermined providers, the selection system comprising:

a reception module configured to receive a geographical position;

a determination module configured to determine an indication relating to the authorization to use at least one provider from the plurality of predetermined providers, the determination module comprising at least one artificial neural network associated with said provider, an input variable of the artificial neural network being the geographical position, an output variable of the artificial neural network being said indication, the indication being selected from authorizing the use of said provider at said geographical position and prohibiting the use of said provider at said geographical position, when the indication indicates authorizing the use of said provider at said geographical position, the provider being referred to as the authorized provider;

a selection module configured to select at least one provider for satellite navigation of an aircraft, from the or each authorized provider.

BRIEF DESCRIPTION OF THE DRAWINGS

These features and advantages of the invention will become clearer on reading the following description, given solely by way of but not limiting example, and made with reference to the appended drawings, in which.

DETAILED DESCRIPTION

Figure 1:
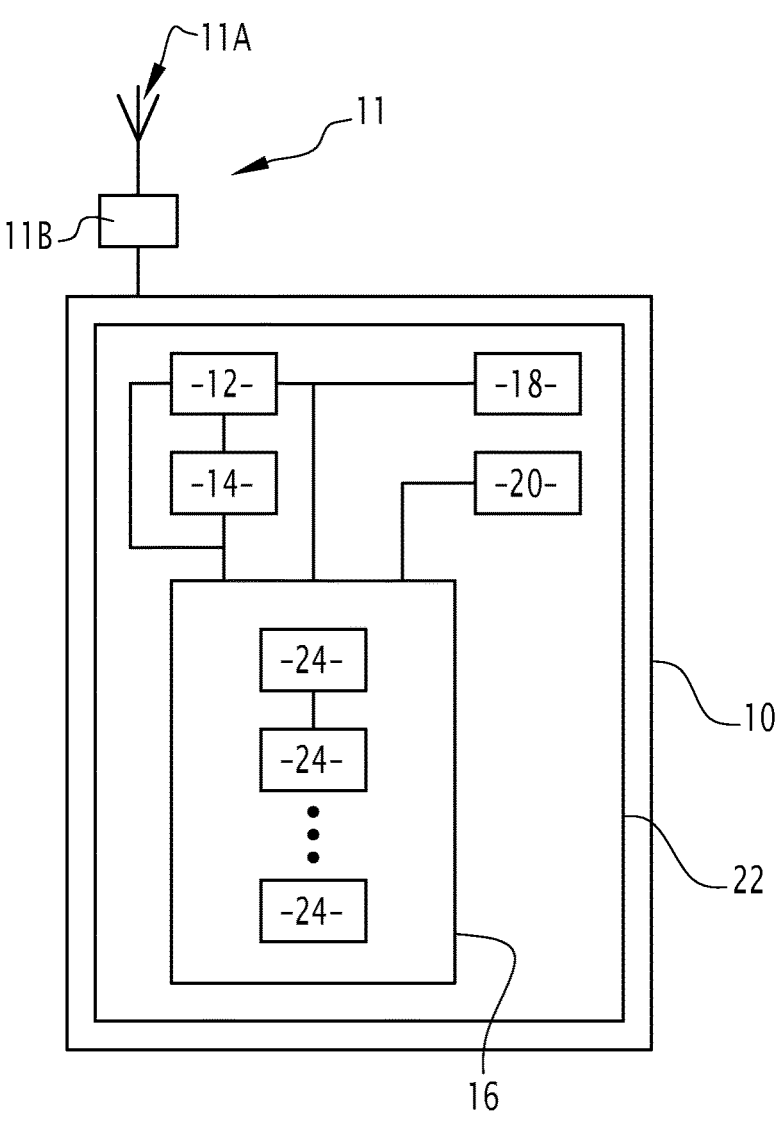
FIG. 1 is a schematic representation of part of an aircraft comprising a system for selecting at least one satellite navigation service provider according to the invention.

With reference to FIG. 1, a selection system 10 is configured to select at least one satellite navigation service provider from a plurality of predetermined providers, for example stored in a database, not shown.

By "provider" is meant in particular an operator of a satellite constellation providing a predefined service.

For example, each provider is an SBAS service provider.

By "SBAS service provider" is meant a service provider of a Satellite Based Augmentation System (SBAS) of one or more basic satellite constellations.

In another example, each provider is a basic constellation service provider.

By "basic constellation service provider" is meant a provider of geolocation and navigation services via a constellation of satellites configured to transmit GNSS (Global Navigation Satellite System) signals. Examples of such constellations are GPS, GLONASS, Galileo and the Beidou satellite navigation system.

Each service provider is able to transmit corresponding data by the satellites associated with that provider. Each service provider is thus in particular a provider of technical data for satellite-based navigation.

For example, each SBAS service provider is able to transmit, via the corresponding satellite(s), SBAS data, comprising for example data relative to the GNSS signal integrity.

The selection system 10 is preferably on board, for example, is on board an aircraft (not shown). Alternatively, some modules of selection system 10 are onboard, and some modules are integrated into not onboard, ground-based equipment. For example, the selection system 10 is at least partially integrated into equipment separate from an aircraft GNSS receiver 11. For example, the selection system 10 is at least partially integrated into the Flight Management System (FMS).

For example, the selection system 10 is connected to the GNSS receiver 11. The GNSS receiver 11 comprises, for example, at least one antenna 11A configured to receive GNSS signals and furthermore a processing unit 11B configured to determine a geographical position from these GNSS signals, and for example, to transmit this position to the selection system 10.

According to an example, not shown, the selection system 10 is integrated into the GNSS receiver. For example, in this case, the selection system 10 and the GNSS receiver processing unit are integrated in the same housing.

The selection system 10 comprises, for example, a reception module 12, a preselection module 14, a determination module 16, a verification module 18 and a selection module 20.

When the selection system 10 is partially integrated into equipment separate from the aircraft GNSS receiver, for example, the reception 12, the preselection 14, the determination 16 and the verification 18 modules are integrated into this remote equipment, and the selection module 20 is integrated into the aircraft GNSS receiver. In this case, the determination module 16 is configured to provide the selection module 20, integrated into the GNSS receiver, with an indication relating to the authorization to use the data provider(s).

The receiving module 12 is configured to receive a geographical position.

The geographical position is, for example, the current position of the aircraft. In this case, the geographical position is, for example, provided by a GNSS receiver, an inertial navigation system, a distance measuring equipment (DME), or a combination of these.

According to another example, the geographical position is a destination position, for example, a runway threshold.

The preselection module 14 is configured to preselect the providers from the plurality of predetermined providers.

The determination module 16 is configured to determine the indication relating to the authorization to use the data provider(s).

In particular, the indication is specific to a given provider from the plurality of providers.

The indication is chosen from authorizing the use of the provider at the geographical position and prohibiting the use of the provider at the geographical position. When the indication indicates authorization of the use of the provider at the geographical position, the provider is referred to as an authorized provider in the following.

The indication is preferably a binary value.

For example, when the indication indicates authorization of the use of the provider, it is equal to "0", and when it indicates prohibition of the use of the provider, it is equal to "1".

The verification module 18 is configured to verify each indication determined by the determination module 16 with a corresponding expected indication.

The verification module 18 is optional. Alternatively, the verification module 18 is integrated into ground equipment, separate from onboard aircraft equipment.

The selection module 20 is configured to select one or more providers for the satellite navigation of the aircraft.

The reception module 12, the preselection module 14, the determination module 16, the verification module 18 and the selection module 20 are each integrated, for example, in at least one computer 22.

In this case, each of the reception module 12, the preselection module 14, the determination module 16, the verification module 18 and the selection module 20 presents at least partly in the form of software that can be executed by a processor and stored in a memory of the computer 22.

Alternatively, or additionally, each of the modules from among the receiver module 12, the preselection module 14, the determination module 16, the verification module 18 and the selection module 20 is at least partially integrated into a physical device, such as for example a programmable logic circuit, such as an FPGA (Field Programmable Gate Array), or in the form of a dedicated integrated circuit, such as an ASIC (Application Specific Integrated Circuit).

The determination module 16 comprises at least one artificial neural network 24, hereinafter referred to as neural network 24.

Preferably, the determination module 16 comprises several neural networks 24, for example one neural network 24 for each service provider.

In particular, each neural network 24 is associated with a corresponding service provider.

Each neural network 24 is configured to receive as an input variable the geographical position, and to provide as an output variable the indication relative to the authorization to use the provider with which this network is associated.

Each neural network 24 comprises, for example, three layers. For example, each neural network 24 comprises an input layer, for example with two nodes, configured to normalize the geographical position received as input. Each neural network 24 further comprises at least one hidden layer, preferably one or more hidden layers, and an output layer.

A selection method 100 will now be described, this method being implemented by the selection system 10. The selection method 100 is thus implemented by the computer.

Figure 2:
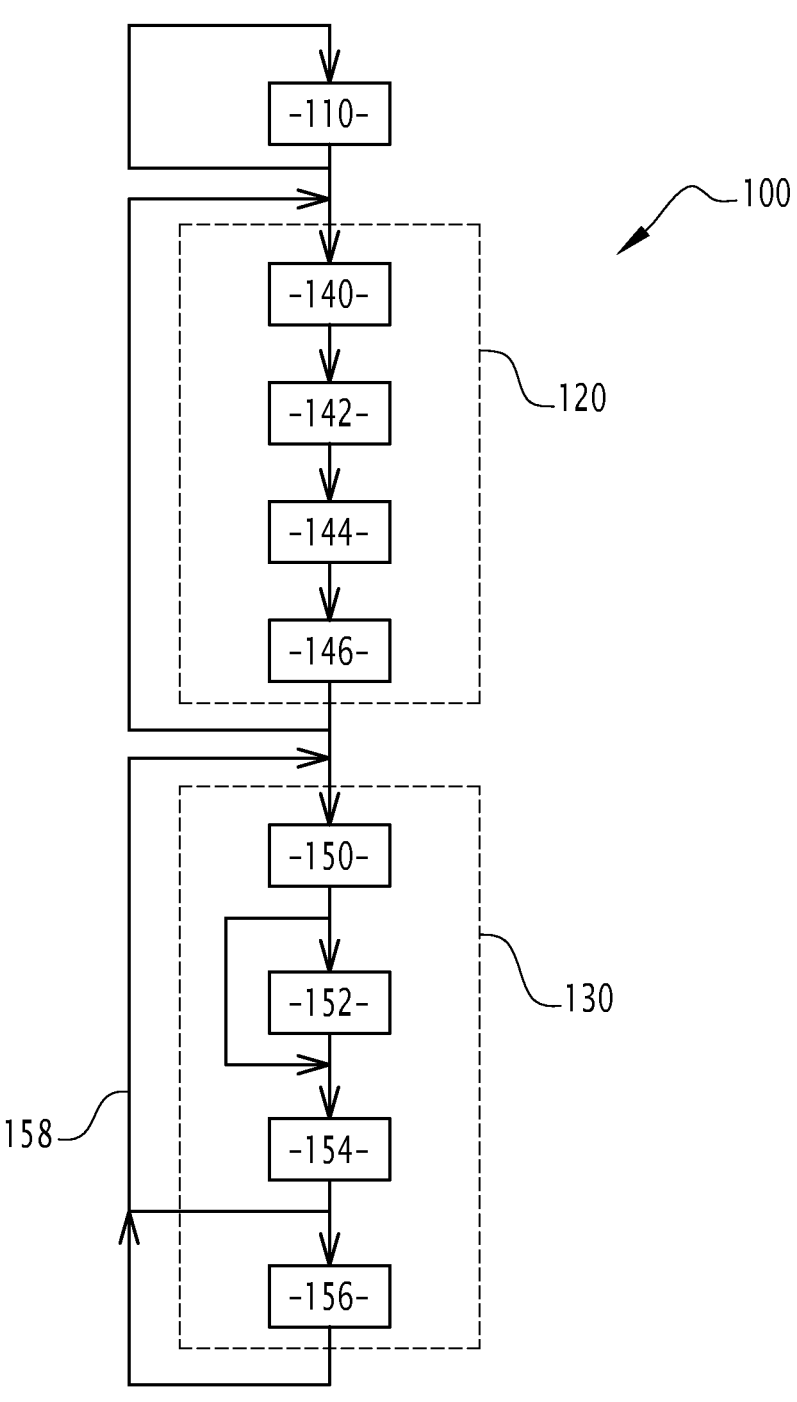
FIG. 2 is a flow chart of a method for selecting at least one satellite navigation service provider according to the invention, implemented by the selection system of FIG. 1.

With reference to FIG. 2, comprising a flowchart of the selection method 100, the method comprises, for example, a training phase 110, a verification phase 120 and an operating phase 130.

The selection method 100 is described below for several neural networks 24. Alternatively, the selection method 100 is implemented by a single neural network 24.

The training phase 110, and optionally the verification phase 120, is/are preferably implemented by equipment not on board the aircraft, and/or prior to a flight of the aircraft.

The operating phase 130 is preferably implemented by the selection system 10 when it is on board the aircraft. For example, the training phase 110 or the verification phase 120 comprises a transmission of parameters of each neural network 24 and/or of the activation regions to equipment onboard the aircraft for implementation of the operating phase 130. These parameters are, for example, weights and biases, the examples of which are described below, of nodes of the neural networks 24.

During the training phase 110, each neural network 24 is trained, preferably by supervised learning.

Preferably, the training phase 110 is implemented separately for each neural network 24.

For example, the training phase 110 is implemented only for an activation region of the provider associated with the given neural network 24.

By "activation region" is meant a predefined region. According to one example, the activation region is defined by the provider. For example, the provider guarantees a quality of service, for example in terms of the integrity of the information provided, within the activation region. According to another example, the activation region comprises the service region predefined by the provider, and furthermore comprises other regions, in which the service is also usable.

In particular, the activation region is different from a region in which signals from a given provider are receivable. For example, in the case of an SBAS provider comprising one or more geostationary satellites, a receiver is able to receive the signals from the provider in a region larger than the activation region of the provider.

For example, each activation region forms a rectangle.

Preferably, the activation regions overlap at least partially. In this way, certain geographical positions are included within the activation regions of at least two different providers, allowing each of these providers to be used for navigation where no constraints prevent this.

Figure 3:
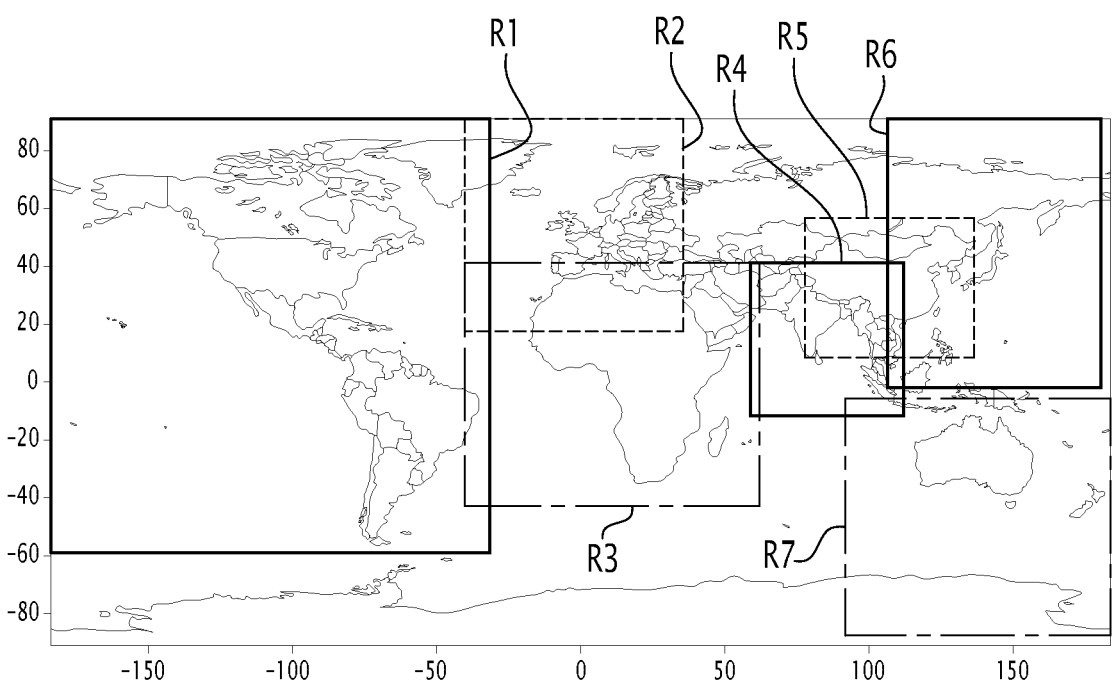
FIG. 3 is a schematic representation of a geographical map comprising a plurality of activation regions of providers selected by the selection process of FIG. 2.

FIG. 3 shows a map comprising different activation regions for SBAS providers. For example, a first activation region R1 is defined by the SBAS provider known as the WAAS system, covering North and South America in particular. A second activation region R2 is defined by the SBAS provider known as the EGNOS system, covering Europe in particular. Activation regions of other SBAS providers are designated by the references R3 to R7 in FIG. 3.

The training phase 110 comprises the provision, to each artificial neural network 24, of a plurality of geographical training positions, as well as the indication for each geographical training position.

Each geographical training position is, for example, user-defined or determined according to a predetermined function.

Preferably, the sampling of geographical training positions is irregular. By "irregular", is meant that the distance between two adjacent geographical training positions is variable.

For example, the number of geographical training positions is increased in a zone comprising a transition between the indication equal to "1" and the indication equal to "0". For example, when, during a training phase 110, a transition of the indication between "1" and "0" is detected, the training phase 110 is repeated, by adding a predetermined number of additional geographical training positions arranged between these two positions. When the training phase 110 is repeated, the given neural network 24 receives the additional geographical training positions, as well as the indication for each of these positions.

Apart from areas comprising a transition between the indication equal to "1" and the indication equal to "0", the distribution of the geographical training positions is preferably regular.

Figure 4:
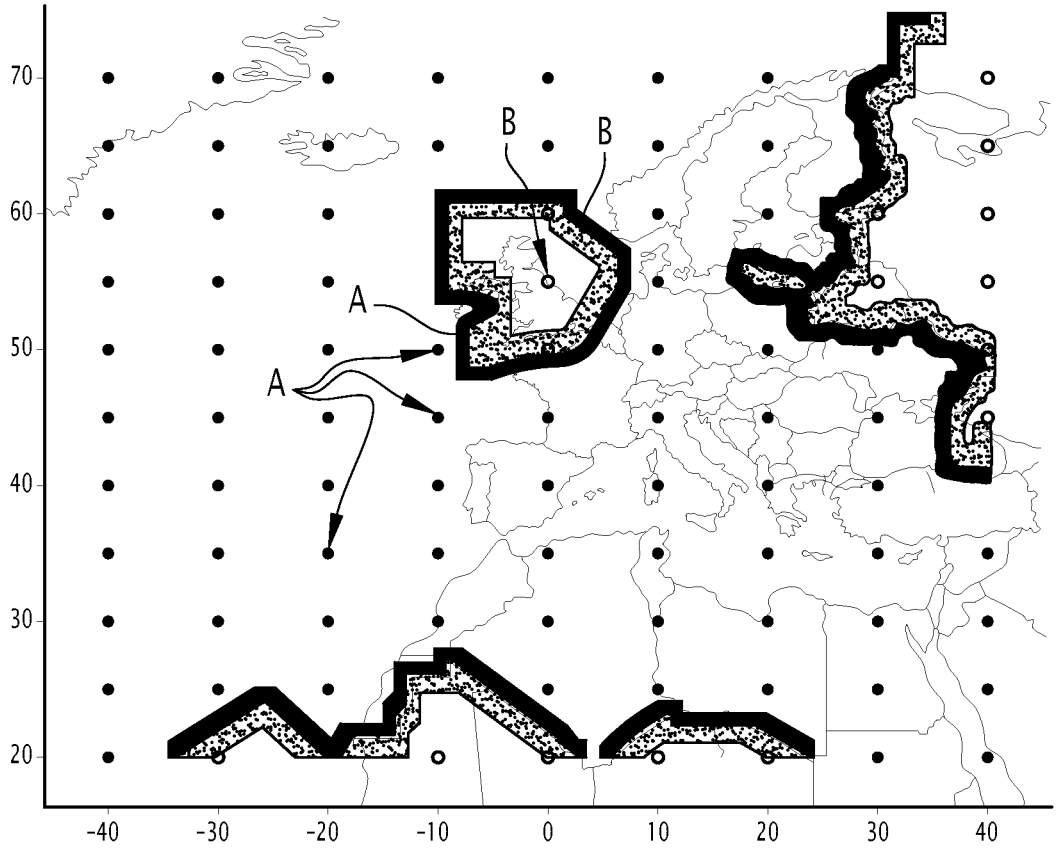
FIG. 4 is a schematic representation of a geographical map comprising indications relating to the authorization of use of a specific service provider, at a plurality of geographical learning positions, for training an artificial neural network of the selection system of FIG. 1.

FIG. 4 shows a geographical map illustrating an example of geographical training positions A, B for the EGNOS system.

The map comprises first geographical training positions A, at which use of the EGNOS system is authorized. These first geographical training positions A are illustrated by black dots in FIG. 4.

The map also comprises second geographical training positions B, at which use of the EGNOS system is prohibited. These second geographical training positions B are illustrated by circles in FIG. 4. By way of example, the second geographical training positions B are positioned on the territory of the United Kingdom, certain parts of Africa and Russia in the example shown in FIG. 4.

FIG. 4 further illustrates the increase in the number of geographical training positions A, B in the zones of the indication transition between "1" and "0". For example, as the use of the EGNOS system is forbidden on the territory of the United Kingdom, the number of geographical training positions A, B is increased around the United Kingdom. This is, in particular, visible in FIG. 4 as a dotted band, corresponding to an accumulation of second geographical training positions B, and as a black band, corresponding to an accumulation of first geographical training positions A.

The indication provided during the training phase 110 depends, for each geographical training position, on at least one element, preferably all of the following elements, for the provider with which the neural network 24 is associated:
  a constraint on use of the provider by at least one state authority at the geographical training position;
  availability of ionospheric corrections of signals, in particular GNSS signals, for the geographical training position;
  a coverage region for one or more of the provider satellites, and
  the activation region predefined for the provider.

By "constraint on use" is meant an obligation or prohibition to use a specific provider, for example on a territory of a state comprising the geographical position.

The availability of ionospheric signal corrections corresponds to the availability, at the geographical training position A, B, of a model for correcting GNSS signal transmission delays caused by the ionosphere, the parameters of which and the region of application are transmitted in the SBAS data, for example.

By "availability of corrections" is meant in particular to the a priori availability of these corrections to the geographical training position. For example, the availability depends on data obtained from the SBAS service provider, considering positions for which the service usually transmits corrections as positions at which ionospheric corrections are available, and other positions as positions at which ionospheric corrections are unavailable.

Preferably, the availability of corrections is static data. In particular, the availability of corrections is independent of an actual ionospheric correction at the geographical training position during implementation of the relevant neural network 24 provider. In other words, for example, this availability does not necessarily reflect the current state of ionospheric corrections at the time the neural network 24 is implemented; it is therefore not a real-time adaptation of the selection from the SBAS service provider as a function of the corrections transmitted.

The coverage region of one or more of the satellites of the provider is the region in which the signals from this or these satellite(s) are receivable. In particular, the size of the activation region of a given provider is smaller than the size of the coverage region of this provider. In particular, the activation region is included in the coverage region.

According to one example, the coverage region is formed by several satellites of the same service provider. In this case, the coverage region, on which the indication provided in the training phase 110 depends, comprises, for example, geographical zones in which several satellites of the same service provider are configured to provide a signal.

During the verification phase 120, the verification module 18 verifies the indications provided at the output of each neural network 24.

The verification phase 120 is preferably implemented for each neural network 24. In the following, the verification phase 120 is described for one of the neural networks 24, for example the neural network 24 associated with the SBAS provider of the EGNOS system. The verification phase 120 for the other neural networks 24 is preferably identical.

The verification phase 120 comprises a supply step 140, an obtaining step 142, a comparison step 144 and a calculation step 146.

During the supply step 140, the neural network 24 receives a plurality of geographical verification positions. The geographical verification positions are determined, for example, by a user or by predetermined positions, for example according to a regular mesh according to which each position presents an identical distance to a neighboring position.

During the obtaining step 142, the neural network 24 supplies as output the indication for each geographical verification position received as input.

During the comparison step 144, the verification module 18 compares each indication obtained in the obtaining step 142 with an expected indication for the corresponding geographical verification position, to obtain a comparison result. For example, when the indication obtained is identical to the expected indication, the comparison result is "1", and when the indication obtained differs from the expected indication, the comparison result is "0".

During the calculation step 146, the verification module 18 calculates a success rate for the neural network 24 as a function of the comparison result. For example, when each indication obtained is equal to the expected indication, the success rate corresponds to a percentage equal to 100%. When half of the indications obtained in the obtaining step 142 are equal to the corresponding expected indications, the success rate corresponds to a percentage equal to 50%.

According to one example, if the success rate is lower than a predetermined rate for a predetermined number of nodes of the neural network 24, the activation region is divided into several sub-regions. The predetermined rate corresponds, for example, to a percentage strictly greater than 99%. The selection method 100, in particular the training phase 110 and the verification phase 120, is then repeated for each sub-region. In particular, the supply step 140, the obtaining step 142 and the comparison step 144 are repeated for each sub-region.

In particular, this improves the success rate of the neural networks 24.

The operation phase 130 is preferably implemented following at least one implementation of the training phase 110 and/or the verification phase 120.

The operation phase 130 comprises a reception step 150, a preselection step 152, a determination step 154 and a selection step 156.

During the reception step 150, the reception module 12 receives the geographical position.

During the preselection step 152, the preselection module 14 preselects at least one provider from the plurality of predetermined providers, as a function of the predefined activation region for this provider. Each provider is preselected when the geographical position lies within the respective activation region. Each preselected provider is referred to as an activated provider.

With reference to FIG. 3, when the geographical position is in the USA, only the SBAS provider called WAAS, defining the R1 activation region, is an activated provider. The other providers, for example the SBAS provider called EGNOS, defining the R2 activation region, is not preselected, and therefore does not form an activated provider.

According to one example, during the preselection step 152, at least one of the activation regions is devoid of geographical positions. In particular, this activation region does not comprise any geographical position in which the provider, for which the activation region is defined, forms one of the activated providers. This activation region corresponds, for example, to a non-operational operator or service provider. In particular, this allows to exclude this provider from the selection by the selection process 100, at all geographical positions, since the determination step 154 and the selection step 156 are implemented, for the corresponding provider, only when the geographical position received during the reception step 150 is included in the activation region.

According to one example, at least one of the activation regions is formed by a region covered by no activation region of the other providers of the plurality of predetermined providers.

According to another example, one of the activation regions is a global region, excluding zones in which the use of a specific provider is imposed, for example, by state authority. This global activation region is, for example, associated with one of the service providers, known as a new provider. For example, for this new provider, its use is prohibited over the United States of America, because the use of the WAAS service provider is imposed there.

According to another example, one of the activation regions is a global region, and during learning in the training phase 110, the neural network 24 for the provider having this global activation region is trained to prohibit the use of this provider at geographical positions in which the use of a specific provider is imposed.

During the determination step 154, the determination module 16 determines the indication relating to the authorization to use the provider(s), using the neural network(s) 24. The determination module 16 thus determines the authorized provider(s).

Preferably, the determination step 154 is implemented by several neural networks 24, each neural network 24 of which is associated with one of the plurality of predetermined providers, providing the respective indication for the provider with which it is associated.

In particular, the determination step 154 is implemented only by the or each neural network 24 associated with an activated provider preselected during the preselection step 152.

Alternatively, determination step 154 is implemented by all neural networks 24 of the selection system 10.

Figure 5:
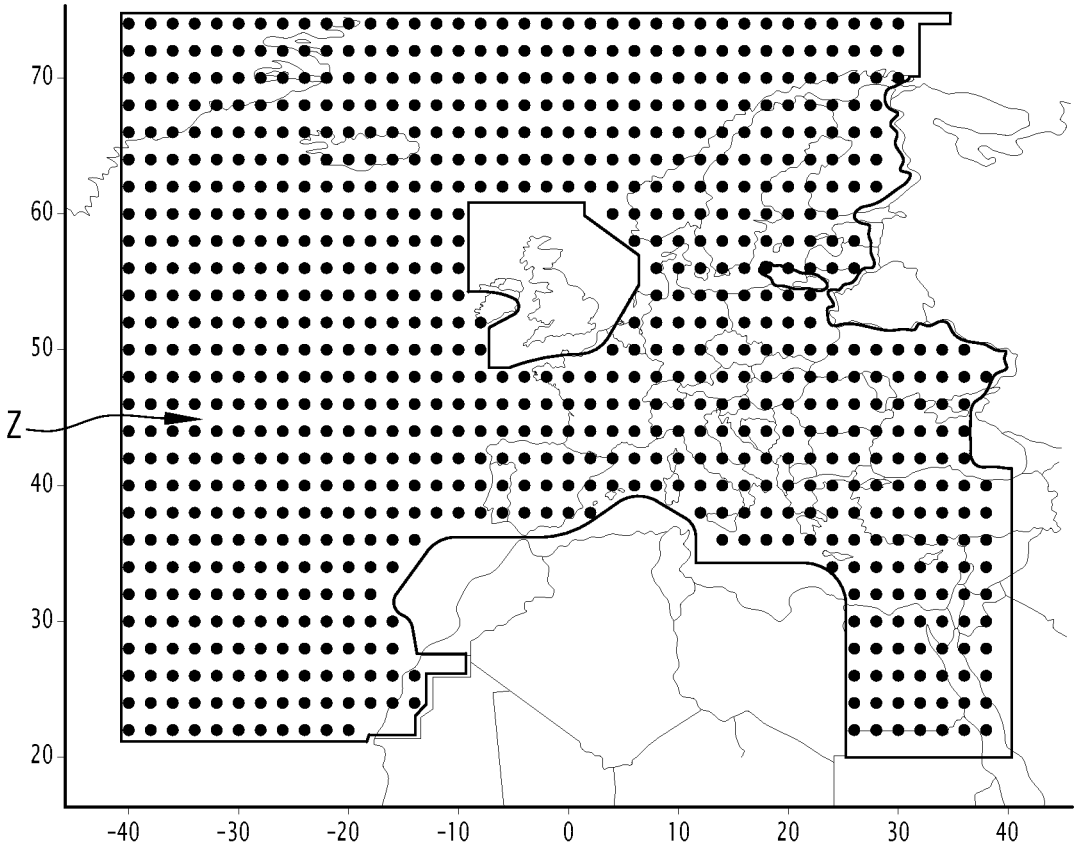
FIG. 5 is a schematic representation of a geographical map comprising, for a plurality of geographical positions, the indication obtained by the artificial neural network of the selection system of FIG. 1 for a specific provider.

With reference to FIG. 5, the indication received at the output of the neural network 24 associated with the EGNOS system is illustrated for geographical positions indicating authorization to use the EGNOS system. These geographical positions are illustrated by black dots. In particular, the geographical positions at which the indication indicates authorization of the EGNOS system form a zone Z.

To obtain the respective indication for the plurality of geographical positions, the operating phase 130 is preferably repeated several times. In particular, steps 150 and 154, and optionally steps 152 and 156, are repeated several times. This is particularly illustrated by arrows 158 in FIG. 2.

According to the invention, the or each neural network 24 receives the geographical position as an input variable, and provides the indication as an output variable, indicating whether or not it is authorized to use the provider corresponding to the geographical position.

In the following example, an example of the operation of each neural network 24 is described, when it comprises the input layer, the hidden layer, and the output layer.

The neural network 24 receives the geographical position from the input layer. The input layer, in particular the set of nodes of the input layer, for example formed by two nodes, normalizes the geographical position, received in latitude and longitude, to values between −1 and 1, for example from the lower and upper boundaries of the activation region of the provider associated with the corresponding neural network 24. When the activation region includes a longitude transition between 180° West and 180° East, the longitudes are, for example, previously converted between 0 and 360°.

The hidden layer comprises N nodes, where N is an integer greater than 2. Each node of the hidden layer presents an activation function which is preferably a sigmoid function. In particular, the activation function of each hidden layer node is equal to:

$$f^{[1]}(x) = \frac{2}{1 + e^{-2x}} - 1$$

where x is the geographical position, normalized by the input layer.

The hidden layer nodes calculate the values $h_{j \in [1:N]}$ from the normalized inputs $x_{i \in [1:2]}$ forming the two values of the normalized geographical position:

$$h_j = f^{[1]}\big(w_{j,i}^{[1]} \times x_i + b_j^{[1]}\big)$$

where:

$$w_{j,i}^{[1]}$$

is a given weight of node j for component i of the normalized geographical position, and $$b_j^{[1]}$$

is a bias of node j.

The output layer is formed, for example, by a node. The node presents an activation function which is preferably a logistic function. In particular, the activation function of the output layer node is equal to:

$$f^{[2]}(x) = \frac{1}{1 - e^{-x}}$$

For example, the output layer node calculates a value y as follows:

$$y = f^{[2]}\big(w_{1,j}^{[2]} \times h_j + b_1^{[2]}\big)$$

where:

$$w_{1,j}^{[2]}$$

is a determined weight of node j in the hidden layer, and $$b_1^{[2]}$$

is a bias of the output layer node.

Preferably, the neural network 24 implements a final function to determine the indication relative to the authorization to use the provider, referred to as indication z, from the value y. For example, the final function is as follows:

$$z = \begin{cases} 0 & \text{if } y \le 0.5 \\ 1 & \text{if } y > 0.5 \end{cases}$$

The indication z, equal to "0" indicates authorization to use the provider with which the neural network 24 is associated, and the indication z, equal to "1" indicates prohibition to use the provider.

Preferably, the weights $$w_{j,i}^{[1]} \text{ and } w_{1,j}^{[2]}$$

and the biases $$b_j^{[1]} \text{ and } b_1^{[2]}$$

are previously learned during the training phase 110, for example using a method called gradient backpropagation method for the number N of hidden layer nodes.

During the selection step 156, the selection module 20 selects at least one provider, from the or each authorized provider, for satellite navigation of the aircraft.

For example, the selection module 20 selects the provider as a function of the quality of service, and/or a predetermined preference, from among the authorized providers.

When the geographical position is the current position of the aircraft, the selection module 20 selects one or more providers.

When the geographical position is a destination position, the selection module 20 preferably selects a single provider to carry out satellite navigation of the approach to the destination position. According to another example, the selection module 20 selects several providers if several providers are authorized.

It is easy to see that the selection process 100 according to the invention presents a large number of advantages.

Indeed, the method of the invention is very simple to implement, as the use of at least one neural network 24 allows to dispense with a complex database to obtain the indication if it is authorized to use a given provider at a given geographical position. Indeed, the selection method 100 allows this indication to be obtained directly from the neural network 24, and that even for geographical positions for which the indication has not previously been taught to the neural network 24.

The invention claimed is:

1. A method for selecting at least one satellite navigation service satellite from a plurality of predetermined satellites, the selection method being implemented by a computer and comprising:

a step of receiving GNSS signals by a GNSS receiver and determining a geographical position based on the GNSS signals;

a step of determining an indication relating to the authorization to use at least one satellite of the plurality of predetermined satellites, the determination step being implemented by at least one artificial neural network associated with said satellite, an input variable of the artificial neural network being the geographical position, an output variable of the artificial neural network being said indication, the indication being chosen from authorizing the use of said satellite at said geographical position and prohibiting the use of said satellite at said geographical position, when the indication indicates the authorization of the use of said satellite at said geographical position, the satellite being referred to as the authorized satellite;

a step of selecting at least one satellite for satellite navigation of an aircraft, from the or each authorized satellite.

2. The selection method according to claim 1, wherein each satellite is an SBAS service satellite or a GNSS service satellite.

3. The selection method according to claim 1, wherein the determination step is implemented by a plurality of artificial neural networks, each artificial neural network being associated with a respective one of the plurality of predetermined satellites, the output variable being the indication for said satellite.

4. The selection method according to claim 1, wherein the or each artificial neural network comprises at least one hidden layer comprising a plurality of nodes, each node implementing an activation function, the activation function being formed by a sigmoid function, wherein the or each artificial neural network further comprises an output layer implementing an activation function formed by a logistic function.

5. The selection method according to claim 1, further comprising a satellite preselection step, during which at least one satellite is obtained from the plurality of predetermined satellites, as a function of an activation region predefined for this satellite, the or each satellite being said to be an activated satellite when the geographical position lies within the respective activation region.

6. The selection method according to claim 5, wherein the determination step comprises determining the indication only for the or each activated satellite, by the artificial neural network(s) associated with said activated satellite(s).

7. The selection method according to claim 5, wherein the activation region of at least one satellite of the plurality of satellites is devoid of geographical positions or is a global region.

8. The selection method according to claim 1, wherein the geographical position is a current position of the aircraft or a destination position.

9. The selection method according to claim 1, comprising a phase of training the or each artificial neural network by supervised learning, comprising providing, to the or each artificial neural network, a plurality of geographical training positions, and comprising providing the indication for each geographical training position.

10. The selection method according to claim 9, wherein the indication provided during the training phase depends, for each geographical training position, on at least one element of the following elements:

a constraint on the use of satellites by at least one state authority at said geographical training position;

an availability of ionospheric signal corrections for the geographical training position;

a coverage region of one or more satellites of one of the plurality of predetermined satellites;

a predefined activation region for one of the plurality of predetermined satellites.

11. The selection method according to claim 1, further comprising a verification phase, comprising:

a step of supplying the or each artificial neural network with a plurality of geographical verification positions;

a step of obtaining, for each geographical verification position, the output indication of the corresponding artificial neural network;

a step of comparing each indication obtained in the obtaining step with an expected indication for the corresponding geographical verification position, to obtain a comparison result;

a step of calculating a success rate of the or each artificial neural network as a function of the comparison result.

12. The selection method according to claim 11, further comprising a satellite preselection step, during which at least one satellite is obtained from the plurality of predetermined satellites, as a function of an activation region predefined for this satellite, the or each satellite being said to be an activated satellite when the geographical position lies within the respective activation region, wherein, when the success rate is less than a predetermined rate for the artificial neural network in the calculation step, the activation region is divided into a plurality of sub-regions, and wherein the providing step, the obtaining step and the comparison step are repeated for each sub-region.

13. A system for selecting at least one satellite navigation service satellite from a plurality of predetermined satellite, the selection system comprising:

a reception module comprising a GNSS receiver configured to receive GNSS signals, the reception module being configured to determine a geographical position based on the GNSS signals;

a determination module configured to determine an indication relative to the authorization to use at least one satellite from the plurality of predetermined satellites, the determination module comprising at least one artificial neural network associated with said satellite, an input variable of the artificial neural network being the geographical position, an output variable of the artificial neural network being said indication, the indication being selected from authorizing the use of said satellite at said geographical position and prohibiting the use of said satellite at said geographical position, when the indication indicates the authorization of the use of said satellite at said geographical position, the satellite being referred to as the authorized satellite;

a selection module configured to select at least one satellite for a satellite navigation of an aircraft, from the or each authorized satellite.

* * * * *